United States Patent
Friesen et al.

(10) Patent No.: US 11,764,957 B2
(45) Date of Patent: Sep. 19, 2023

(54) METHOD FOR SECURE USAGE OF CRYPTOGRAPHIC MATERIAL

(71) Applicant: MERCEDES-BENZ GROUP AG, Stuttgart (DE)

(72) Inventors: Viktor Friesen, Karlsruhe (DE); Viktor Pavlovic, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/926,718

(22) PCT Filed: May 7, 2021

(86) PCT No.: PCT/EP2021/062157
§ 371 (c)(1),
(2) Date: Nov. 21, 2022

(87) PCT Pub. No.: WO2021/233696
PCT Pub. Date: Nov. 25, 2021

(65) Prior Publication Data
US 2023/0198753 A1 Jun. 22, 2023

(30) Foreign Application Priority Data
May 22, 2020 (DE) .................. 10 2020 003 072.6

(51) Int. Cl.
*H04L 9/08* (2006.01)

(52) U.S. Cl.
CPC ............ *H04L 9/088* (2013.01); *H04L 9/0897* (2013.01)

(58) Field of Classification Search
USPC ........ 380/286, 255, 264, 276; 726/2, 21, 36; 713/150, 163, 181
See application file for complete search history.

(56) References Cited

U.S. PATENT DOCUMENTS

| 7,412,053 B1* | 8/2008 | Lyle | H04L 9/0844 714/724 |
| 8,776,205 B2* | 7/2014 | Alrabady | H04L 9/3263 713/176 |

(Continued)

FOREIGN PATENT DOCUMENTS

| DE | 102011117006 A1 | 5/2012 |
| DE | 102016210788 A1 | 8/2017 |
| EP | 0735722 B1 | 1/2005 |
| EP | 3309702 A1 | 4/2018 |

(Continued)

OTHER PUBLICATIONS

International Search Report and Written Opinion dated Jul. 21, 2021 in related/corresponding International Application No. PCT/EP2021/062157.

(Continued)

*Primary Examiner* — Sharif E Ullah
(74) *Attorney, Agent, or Firm* — PATENT PORTFOLIO BUILDERS PLLC

(57) ABSTRACT

A method for secure usage of cryptographic material in networked system components provided with the cryptographic material in which a lifecycle of every system component includes at least one development phase and one production phase. The entire cryptographic material is at least directly securely marked as development or production material. Each system component has a binary state flag showing which phase the system component is in and which is secured against unauthorized manipulation. Each system component determines via an assessment function which phase it is in, according to which each system component carries out a check, during which the current phase and the marker of the cryptographic material are compared. Security measures are introduced if there is no agreement between the phase and the marker.

9 Claims, 1 Drawing Sheet

(56) References Cited

U.S. PATENT DOCUMENTS

| | | | | |
|---|---|---|---|---|
| 10,303,886 | B2* | 5/2019 | Tschache | G06F 21/602 |
| 10,778,447 | B2* | 9/2020 | Lin | G06F 21/74 |
| 2014/0331050 | A1* | 11/2014 | Armstrong | H04L 9/0855 |
| | | | | 380/278 |
| 2016/0012252 | A1* | 1/2016 | Deleeuw | G06F 21/6254 |
| | | | | 726/26 |
| 2016/0315763 | A1* | 10/2016 | Hammon | H04L 9/0656 |
| 2017/0237558 | A1* | 8/2017 | Yuan | H04L 9/12 |
| | | | | 380/279 |
| 2017/0270290 | A1* | 9/2017 | Inoue | G06F 21/44 |
| 2017/0359306 | A1* | 12/2017 | Thomas | H04L 63/145 |
| 2018/0139060 | A1* | 5/2018 | Lin | H04L 9/3226 |
| 2019/0182034 | A1* | 6/2019 | McCarthy | H04L 9/0852 |
| 2020/0336301 | A1* | 10/2020 | McCarthy | H04L 9/0877 |
| 2020/0336304 | A1* | 10/2020 | Hammon | H04L 9/0869 |

FOREIGN PATENT DOCUMENTS

| | | |
|---|---|---|
| EP | 3599567 A1 | 1/2020 |
| JP | 2018010433 A | 1/2018 |
| WO | 2017008728 A1 | 1/2017 |

OTHER PUBLICATIONS

Office Action created Mar. 11, 2021 in related/corresponding DE Application No. 10 2020 003 072.6.
Office Action dated Mar. 20, 2023 in related/corresponding KR Application No. 10-2022-7040589.
Office Action dated Jun. 6, 2023 in related/corresponding JP Application No. 2022-571844.

* cited by examiner

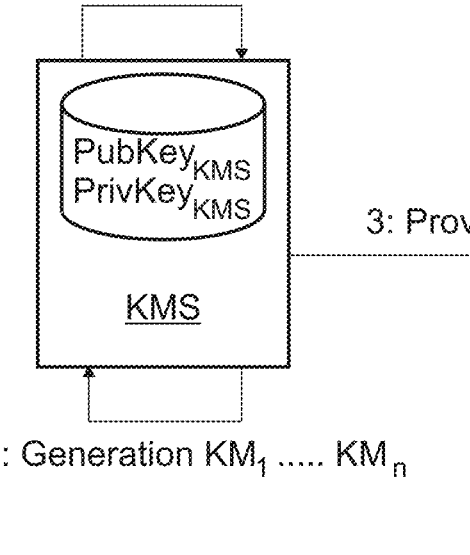
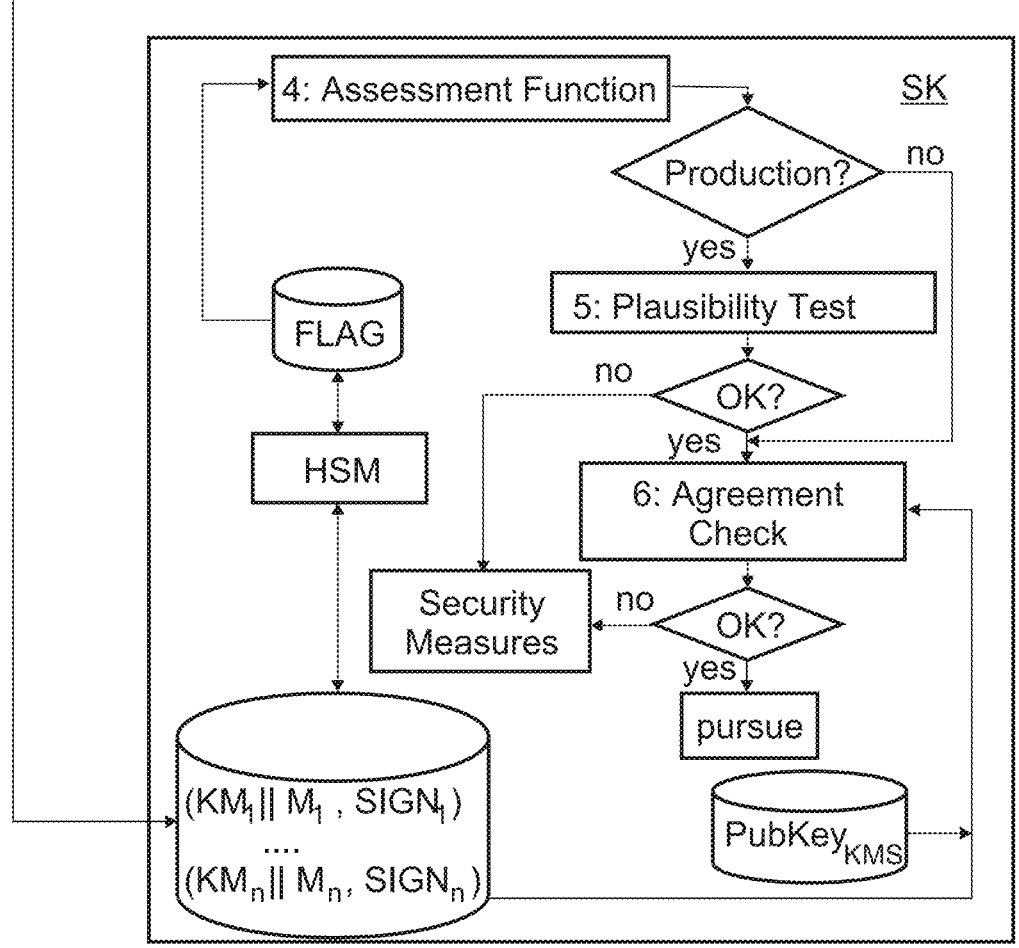

METHOD FOR SECURE USAGE OF CRYPTOGRAPHIC MATERIAL

BACKGROUND AND SUMMARY OF THE INVENTION

Exemplary embodiments of the invention relate to a method for secure usage of cryptographic material in several system components of a networked system.

The method for secure usage of cryptographic material is substantially concerned with the fact that in development phases of system components of a networked system that are provided with the cryptographic material, different cryptographic material must be used than in the later production phase of these system components. This relates in particular, but not exclusively, to the area of so-called car IT security for vehicles.

Modern vehicles, but also other systems, are characterized by being increasingly networked. Vehicles are not only connected to generally accessible systems such as the World Wide Web, but also to dedicated systems and servers of the vehicle producer or OEM, for example producer-owned applications and a producer-owned server, also frequently described as a backend server. These are developed, marketed, and operated by the producer exclusively for their own vehicle fleet. The sum of all these systems is also described as the vehicle ecosystem.

In practice, it is now the case that myriad new interfaces and applications result from the various communication relationships between the individual system components within a vehicle ecosystem of this kind, all of which must be secured by suitable cryptographic methods, e.g., mechanisms, protocols, etc. These cryptographic methods, which are known in principle from the state of the art, require various cryptographic material for this purpose, e.g., asymmetric key pairs, symmetric keys, certificates, random numbers, etc. All of these are coordinated with each other, and are installed and must be used by all participating system components before they are put into operation in the vehicle ecosystem. The preparation of the cryptographic material, so-called provisioning, occurs during the production process, for example. The system components here particularly comprise control devices built into the vehicle, but also other components, such as applications installed in the vehicle, applications of the OEM available on a smartphone, and the like.

It is absolutely necessary to differentiate between cryptographic material that is used in the development phase and cryptographic material that is used during the production phase, and thus the actual usage of the finished developed product, in order to reliably prevent that the protected communication can be interfered with. The cryptographic material for the development phase is subsequently also described as test cryptomaterial. Exclusively this test cryptomaterial can be used in the development phase. The production cryptomaterial, and here in particular secret production cryptomaterial, must specifically be protected from unauthorized access during the entire lifecycle of the system components. In the ideal case, this protection should here be guaranteed by maintaining a specially secured process and using special protection mechanisms in the respective development departments and production facilities. In the development phase, however, this is usually only insufficiently guaranteed, as different building blocks of the networked system are largely not or not yet carried out or implemented in this development phase.

Thus, the secure generation of the required cryptographic material cannot yet be completely carried out or tested, for example. The secure transfer of the cryptographic material from the generation server, the so-called cryptomaterial server, to the system producer, for example a supplier, is not yet ascertained in some cases. The safe import of the cryptomaterial into the system components has not or has not yet been finally carried out. The secure saving of the cryptographic material in these system components is potentially not yet carried out, because, for example, the target system does not yet have a hardware security module (HSM) installed, although it should still be installed at a later point in time. The secure usage of the cryptographic material in the system is potentially not yet carried out, for example because the necessary development interfaces for testing and debugging are present, having a reading and writing access to the entire system, and thus in particular allowing an access to the installed cryptographic material during the development phase. These interfaces are necessarily present during the development, however, and are also mostly openly accessible for every person and/or firm involved in the development process.

This therefore means that it cannot be ascertained that the test cryptomaterial is not manipulated or read. It is here the case, however, that this test cryptomaterial is identical in its structure and form to the production cryptomaterial used later. Thus, it is also suitable for usage in later operation, and thus in the production phase of the respective system component. It is thus particularly important that the relatively badly secured, and therefore highly probably corrupted test cryptomaterial is not used in the production system in an abusable manner. It is even more serious if production cryptomaterial reaches a system component in the development phase. This material, which has been actually assessed as very secure, can then also be manipulated, or entirely or partially read. It is thus no longer secret and cannot be used. If the mistake remains unnoticed or is intentionally concealed, then the system component, which later switches into the production phase, loses its security.

In practice it is the case that the safety regulations and guidelines are carried out by the people concerned with the system components in the phases. For this reason, mistakes, oversight, and also conscious manipulations cannot be ruled out. For this reason, the danger always exists in principle that test cryptomaterial remains in a system component already switched into the production phase, or that production cryptomaterial is used on a system component that is still in the development phase. Any cryptomaterial used consciously or accidentally in the development phase is highly likely corrupted due to the many interfaces that are still open etc. These dangers ultimately lead to a heightened security risk. This represents a serious disadvantage of the existing approach.

In the further state of the art, reference can also be made to EP 0 735 722 B1. In this document, a key management system for generating, distributing, and managing cryptographic keys, and thus cryptographic material, is described. Several individual processing elements and domains are involved here, which can be correspondingly administered via a central computer or server, in order to guarantee a secure exchange of the keys between these system partners of the networked system.

Exemplary embodiments of the present invention are directed to an improved method for handling cryptographic material in system components having a development phase and a production phase, which in particular effectively solves the security-related disadvantages given above.

The method according to the invention serves the safe usage of cryptographic material in several system components, e.g., control devices, applications, and the like. These are parts of a networked system, and are provided with cryptographic material. The system components here have a lifecycle that comprises at least one development phase and one production phase. The method according to the invention now provides several steps in order to now reliably and without the danger of human failure prevent that cryptographic material from the development phase is used in the production phase and vice versa. These steps comprise that the entire cryptographic material is at least directly securely marked as development or production material. Individual elements, e.g., keys, which cannot be directly marked, can here be directly marked via the assigned certificates. These can, for example, be cryptographically secured. The cryptomaterial has the corresponding marker, for example with TEST and PROD, as test cryptomaterial or production cryptomaterial. It can be read and verified at any time by means of the suitable cryptographic measures corresponding to their security.

It is now the case that the cryptographically secured marker alone is not sufficient to prevent the test material being used in the real system components in the production phase or vice versa, the production cryptomaterial being used in the development phase. The cryptographically secured marker may be able to be used to clearly differentiate test cryptomaterial from production cryptomaterial. It cannot be guaranteed, however, that this material is actually present in the system components implemented in the production phase. In order to achieve this now, it is necessary that the system components can recognize whether they are in the development phase or the production phase automatically and in a manner secure from manipulation.

For this purpose, the method according to the invention uses a binary state flag that shows the development phase or the production phase. This flag is implemented in the system components and is secured against unauthorized manipulation. Using these two measures, it is now possible to achieve the goal that each system component can clearly recognize for itself which cryptographic material is loaded or prepared for loading for the components. The system component is also in the position to determine its own state by means of the state flag, and thus knows whether it is in the development phase or the production phase.

The system component then carries out a check in the method according to the invention, during which the current phase, and thus development phase or production phase, and the marker of the cryptographic material are compared. If there is no agreement, and thus the wrong cryptographic material is installed or prepared for installation in the current phase, then suitable security measures are introduced in order to repress the use of the "wrong" cryptographic material with regards to security in the corresponding phase. The security measures can here be differently designed, as long as they are in the position to lift or at least to show an unsafe state. More detail on the security measures will be given later.

The method according to the invention here has very decisive advantages. On the one hand, it ensures that a system component in the development phase cannot be either intentionally or accidentally operated with production cryptomaterial that is insufficiently protected in some cases. On the other hand, the method ensures that a system component in the production phase cannot be either intentionally or accidentally operated with test cryptomaterial that potentially is not secure. The system component itself is now in the position to guarantee its safe operation with the cryptographic material suitable for this purpose. Neither an intentional manipulation nor accidental mistakes in the production process can thus remove the secure operation of the respective system component.

Both the state flag and the marker of the cryptographic material can here be secured via cryptographic measures according to an advantageous embodiment of the invention. The marker can thus be put in the certificates assigned to the keys, for example, and be correspondingly signed with a private key. The corresponding marker can then be called up and verified at any time by means of the associated public key. Other cryptographic methods suitable for securing the integrity of the marked cryptographic material, for example symmetric Message Authentication Codes (MAC), can of course be used in place of a digital signature of this kind.

There are alternatively or additionally further options for the state flag in particular to be formed in a manner secure from manipulation according to a very convenient development of the method according to the invention. These options are substantially hardware-based and secure the state flag, for example, in that the latter is written in a WORM-memory. A WORM (write once read many) memory of this kind allows its state to be changed only once, in that, for example, starting from a development flag with the value zero, the value is set to one, which corresponds to the production flag. This is relatively secure, but has the potential disadvantage that system components once switched into the production phase cannot be switched back, which can increase the development costs in some cases, if another mistake does have to be corrected after the switch. As an alternative, the state flag can thus also be saved in a so-called hardware security module (HSM), and so be largely secured against manipulation, but can still be changed again if needed by the producer or the OEM.

If a hardware-based securing of this kind is not possible for technical reasons, because no WORM or no HSM is provided, for example, or because the hardware of the system is not in the sovereignty of the OEM, for example in the case of smartphone apps, then the software-supported securing via cryptographic measures described above can then be considered, as already mentioned. In principle, these could also be combined with the hardware solution if a WORM memory or HSM is present, which mostly appears unnecessary for the practice, however.

The system components can now securely recognize whether the introduced cryptographic material is marked correspondingly to the operation phase introduced via the two measures of the method according to the invention, specifically the marking of the cryptographic material and the implementation of the state flag. This should ideally be ensured before the cryptographic material is used.

For this purpose, the check of the agreement can be immediately carried out at different points in time. Two general ways of proceeding are possible here according to a particularly advantageous development of the method according to the invention. This is first of all the checking of the agreement before the respective use of the cryptographic material, and thus an individual check, before the corresponding material, for example a particular key or a particular certificate comes into immediate use. Alternatively, and preferably, the agreement check occurs uniquely for the entire cryptographic material.

Here it is provided according to a very convenient embodiment of the method according to the invention that a check of the agreement is carried out for the entire cryptographic material as soon as it is prepared, and thus when it is introduced into the system components. A check during this so-called provisioning of the cryptographic material is very secure, as until this point in time the cryptographic material has not been saved or used anywhere within the system components. In practice, however, this is not always possible, as carrying out the check for agreement requires a powered-up system component, that must therefore be running. Depending on the embodiment, however, the preparation or the provisioning can also occur directly in the memory without the system component having to be powered up for this purpose. This can occur, for example, if powering up the system component already requires the presence of cryptographic material. In these cases, the check for agreement should occur as soon as possible, and thus in particular in or during the first powering up of the system component after the cryptographic material is prepared. Similar also applies in particular if cryptographic material is delivered in the process of a system update or the like, for example, as this then correspondingly applies for the first powering up according to the renewed preparation of expanded cryptographic material, for example, in the process of a system update.

The state flag, as already mentioned, is an indicator secure against manipulation of which phase the system component is currently in. This can be set at a suitable point in time during the production of the device by an instance having the corresponding authority. In practice, however, a state flag set to production is not a guarantee that the installed cryptographic material in the system component is actually sufficiently protected. Development and debugging interfaces can still be present, for example, if their switching or their deinstallation has been consciously or accidentally forgotten, for example. For this reason, a particularly convenient embodiment of the method according to the invention suggests the system component carries out a plausibility test for the production phase if the assessment function has determined that the system component is in the production phase, and the state flag is correspondingly set to "production". For this purpose, pre-determined conditions for the production phase are checked in order to verify that all requirements of the production phase are actually given, and thus that the protection of the production cryptomaterial is guaranteed. The typically present conditions that are checked during the plausibility test can relate to a pre-defined list of development and debugging interfaces, for example, for which it has been determined that they should no longer be usable in the production phase. The check thus determines whether these interfaces are correspondingly switched off or uninstalled.

The plausibility test for the production phase thus ensures that conditions for the production mode are complied with. It does not play a role in the development phase, such that no check is carried out here or this does not lead to corresponding security measures being introduced, as would be the case if individual interfaces were not yet deactivated in the production phase.

The plausibility test can here be carried out at different points in time analogous to the agreement check. It is preferably carried out before the cryptographic material is prepared for the respective system components. It can thus be ensured that the preparation or the provisioning never occurs, and that the cryptographic material provided for the production phase never reaches the system component that is potentially not secure in the first place. As already mentioned above, however, this is not always possible, as the system component must be powered up in order to carry out the plausibility test. If the provisioning occurs directly in the memory as described above, then the plausibility test can also occur before the system component is booted up for the first time after the preparation or after a new preparation of the cryptographic material, as described above. It is important that this is done as early as possible, and preferably before the agreement check.

If the check of the agreement or the plausibility test too fails, then the system component will take corresponding security measures. The latter comprise at least one warning message, in order to make the operator of the networked system and/or other system components aware of the "problem" occurring according to a very advantageous embodiment of the method according to the invention. If, for example, the agreement check determines that test cryptomaterial is being used in the production phase, then a state of the system component that is potentially not secure is present. Other suitable measures, for example restricting a usage or switching it off entirely would be possible in addition to the warning that the system component generates.

If the agreement check in the development phase or the plausibility test in the production phase returns an error, then the system component must work on the basis that the installed cryptographic material is no longer secure. Here it is not possible to make secret cryptographic material that may once have been exposed secure again, as its secret cannot be restored. The following reaction can be made as a security measure, for example. First, the not yet (fully) completed preparation of the cryptographic material, and thus the provisioning, can be prevented, or at least halted. Moreover, the potentially corrupted cryptographic material can be removed from a usage, for example by securely deleting it in the system component. If the cryptographic material is already uploaded and one of the checks fails when the system component is booted up for the first time, then a warning can also be emitted, for example registered in a log file and/or transmitted. If a display device is available then the warning can also be immediately displayed. In the production of the system components, an acoustic display or the like would also be conceivable, for example. It is thus conveyed that the potentially-installed production cryptomaterial is no longer secure, and must correspondingly be discarded. If the system component here has the connection to a central server, for example a cryptomaterial server, then the warning can also include the notification of this center.

In practice, there can also be cases in which the usage of the installed cryptographic material in the other participating system components of the vehicle ecosystem cannot generally be avoided for cost reasons or technical reasons, despite the potential corruption of the cryptographic material of a system component. This can be the case, for example, if the cryptographic material in the other participating system components can no longer be switched out. In such a case, it can help to stop the implementation of the system component, in order to minimize the likelihood of an actual corruption of the production cryptomaterial. The installed production cryptomaterial is then immediately securely deleted in the affected system component, as already indicated above.

As already mentioned, the method can be implemented for different system components in different kinds of systems. Its usage is particularly efficient if the networked system is a vehicle ecosystem, as the corresponding requirements regarding an extensive development having many involved partners here frequently makes it very difficult to uphold security guidelines in practice. The danger of a potential security gap can be drastically minimized by implementing the method according to the invention, and thus a self-check via the respective system component.

Further advantageous embodiments arise from the exemplary embodiment which is described in the following in more detail with reference to the FIGURE.

BRIEF DESCRIPTION OF THE SOLE DRAWING

The sole FIGURE shows a schematic depiction of a possible exemplary embodiment of the method according to the invention.

DETAILED DESCRIPTION

The sole FIGURE illustrates the method according to the invention in a possible embodiment. The method here ensures that a system component SK can neither intentionally nor accidentally be operated with the wrong cryptomaterial KM in the test mode. The goal here is to ensure a secure usage of cryptographic material KM both in a development phase and a production phase of a system component SK, which is intended to be part of the vehicle ecosystem. The system component SK can, for example, be vehicles, individual control devices, external devices, applications of the OEM, a backend server, for example of the OEM, and the like. All these system components SK are provided with the same cryptographic material KM, and have a lifecycle that consists of at least two phases, a development phase on the one hand and a production phase on the other.

The entire cryptographic material KM is generated in a first step 1 on a cryptomaterial server KMS, and correspondingly marked in a second step, and signed with a private key PrivKey of the cryptomaterial server KMS. The cryptomaterial KM as test cryptomaterial or as production cryptomaterial has the corresponding marker M. It can be verified at any time with the assistance of the public key $PubKey_{KMS}$ of the cryptomaterial server KMS.

A securing of the marker via cryptographic methods is thus depicted in the illustration. In detail, a syntactic marker that is secure from manipulation of this kind could follow in the case of X.509 certificates, for example, by attaching it to one of the partial fields of the X.509 subject field by a string TEST being attached for the development phase or PROD for the production phase. Alternatively, in the case of certificates of this kind, special extensions having corresponding content can also be added and used for this purpose, for example TEST and PROD. The associated private key PrivKey is then also correspondingly indirectly marked by the marker M of the certificate itself. Cryptomaterial KM not connected to the certificates, for example symmetric cryptomaterial, can also be concatenated with a marker M based on the certificates, meaningfully TEST and PROD in turn, wherein this concatenation is subsequently depicted by the double strokes. The result is then signed by a central location, here for example the cryptomaterial server KMS. The accuracy of the certificate or the signature SIGN can be checked at any time using the public key $PubKey_{KMS}$ of the originator, wherein the marker M of the respective cryptographic material KM can be securely ascertained. This check can also be securely made during the run time of the system components SK, in which the signed cryptographic material KM is installed.

The third step is now the preparation of this cryptographic material KM, which is connected with the corresponding feature M. The cryptographic material KM is correspondingly signed, and now enters the system components SK during the provision, and is there correspondingly deposited in a memory. A hardware security module HSM, in which a state flag is also saved, denoted with "FLAG" in the illustration, serves this purpose. The state flag FLAG is here also protected against manipulation via the HSM and being saved in the HSM. As already mentioned in the introduction, alternative methods, e.g., a WORM memory and/or a cryptographic method, are also conceivable.

In the fourth step, an assessment function is then carried out, by means of which the system component SK can ascertain which phase it is in, i.e., in the production phase or in the development phase. The FLAG is evaluated for this purpose. If it is ascertained according to this assessment function that the system component SK is in the production phase, then a plausibility test occurs in the fifth step. During this plausibility test, it is checked in the system component whether all pre-determined interfaces that were implemented only for the development are switched off and/or uninstalled, in order so to ascertain that no unwanted and unpermitted access to the system component SK can occur any longer. If this plausibility test is also positively concluded, then the agreement check is made in the sixth step. In the event that the assessment function has returned that the system component SK is not In the production phase, but the development phase, then the fifth step is skipped.

During the agreement check, it is now checked whether the marker M of the cryptomaterial KM matches the phase detected via the assessment function. Thus, if the system component SK is in the development phase, then the marker M of the cryptomaterial KM should be "TEST". If it is in the production phase, the marker must correspondingly be "PROD". If this is the case, then the correct cryptomaterial for the corresponding phase is present in the system component SK. The method is then further pursued, and the system component can take up the operation for which it is provided within the networked vehicle ecosystem.

If, in the plausibility test in the fifth step, as long as it is carried out when the system component SK is in the production phase, it is determined that individual interfaces were not deinstalled or closed, then security measures can immediately be introduced before the agreement check ever occurs. If the plausibility test concludes positively, and thus all requirements for the production phase are fulfilled in the system component SK in which they are switched, then the agreement check also occurs here as already mentioned. The result when the agreement is checked can now show that a mistake is present. Test cryptomaterial can thus be used in the production phase, for example, which is potentially corrupted, or production cryptomaterial can be used in the development phase that was not supposed to have been used in the development phase in such a way that it could be corrupted in the process, since a secret of the cryptomaterial KM once revealed cannot be restored. In these two cases of an unsuccessful agreement check too, security measures are introduced which substantially need not differ from those in the plausibility check.

As far as possible, both the agreement check and the plausibility test should already occur directly during provisioning. If it is ascertained in this phase that the plausibility test or the agreement check are not ok, then a suitable security measure can be introduced, for example a warning message can be emitted or distributed and saved in the network, and the provisioning process can preferably be halted. If cryptomaterial KM has already been introduced, then this is securely deleted. If the agreement check cannot be carried out during provisioning, and nor can the plausibility test, because, for example, the provisioning occurs such that the system component SK has not been powered up yet, then the plausibility test and the agreement check should still occur as quickly as possible. In this case, it can occur, for example, when the system component is booted up, and thus preferably in its first booting process. Here too, if the plausibility test and/or the agreement check are not ok, the corresponding security measures can be introduced, which in this case can additionally provide a stopping of the system component SK or an at least only very strictly limited operation of the system component SK.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for secure usage of cryptographic material in several system components of a networked system that are provided with the cryptographic material, wherein the lifecycle of every system component comprises at least one development phase and one production phase, the method comprising:
    at least directly securely marking the entire cryptographic material as development or production material, wherein each of the several system components comprises a binary state flag showing which phase the system component is in, wherein the binary state flag is secured against unauthorized manipulation;
    determining, by each of the several system components, using an assessment function, a current phase that the respective one of the several system components is in;
    checking, by each of the several system components, by comparing the current phase and a marker of the cryptographic material, wherein the marker of the cryptographic material indicates whether the cryptographic material is development phase cryptographic material or production phase cryptographic material; and
    introducing security measures when the check indicates that there is no agreement between the current phase and the marker, wherein
    the checking is performed a first time the several system components are booted up after preparing the cryptographic material or when the cryptographic material is being prepared for the respective system component in the system component, and
    the system component performs a plausibility test for the production phase if the assessment function determines that the system component is in the production phase, for which purpose predetermined conditions for the production phase are checked, wherein if at least one of the predetermined conditions is not fulfilled, security measures are introduced.

2. The method of claim 1, wherein the marker of the cryptographic material or the binary state flag is secured via cryptographic measures.

3. The method of claim 2, wherein the binary state flag is secured in a memory that can only be written once or is secured in a hardware security module.

4. The method of claim 1, wherein the checking occurs in the system component.

5. The method of claim 1, wherein the plausibility test occurs before the first checking and after the preparation of the cryptographic material, or before the cryptographic material is prepared for the respective system component in the respective system component.

6. The method of claim 1, wherein the security measures comprise at least one warning message.

7. The method of claim 1, wherein the security measures comprise a halting or a prevention of the preparation of the cryptographic material, wherein non-matching cryptographic material that is potentially already introduced is securely deleted in the system component.

8. The method of claim 1, wherein the security measures comprise stopping implementation of the system component.

9. The method of claim 1, wherein the networked system is a vehicle ecosystem.

* * * * *